(12) United States Patent
Uno

(10) Patent No.: US 12,367,000 B2
(45) Date of Patent: Jul. 22, 2025

(54) IMAGE FORMING DEVICE AND NON-TRANSITORY COMPUTER-READABLE RECORDING MEDIUM STORING COMPUTER-READABLE INSTRUCTIONS FOR IMAGE FORMING DEVICE

(71) Applicant: BROTHER KOGYO KABUSHIKI KAISHA, Nagoya (JP)

(72) Inventor: Akihito Uno, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/338,541

(22) Filed: Jun. 21, 2023

(65) Prior Publication Data
US 2023/0418532 A1    Dec. 28, 2023

(30) Foreign Application Priority Data
Jun. 22, 2022 (JP) .................................. 2022-100640

(51) Int. Cl.
G06F 3/12 (2006.01)

(52) U.S. Cl.
CPC ............ *G06F 3/126* (2013.01); *G06F 3/1234* (2013.01); *G06F 3/1236* (2013.01); *G06F 3/1288* (2013.01)

(58) Field of Classification Search
CPC ...... G06F 3/126; G06F 3/1234; G06F 3/1236; G06F 3/1288
See application file for complete search history.

(56) References Cited

U.S. PATENT DOCUMENTS

| | | | |
|---|---|---|---|
| 11,025,730 B1 * | 6/2021 | Inoue | H04L 67/56 |
| 2013/0050739 A1 * | 2/2013 | Oshima | G06F 3/1234 |
| | | | 358/1.14 |
| 2013/0060950 A1 * | 3/2013 | Furuta | G06F 3/1203 |
| | | | 709/227 |
| 2015/0070727 A1 * | 3/2015 | Asada | G06F 3/1236 |
| | | | 358/1.15 |
| 2015/0378657 A1 * | 12/2015 | Hagai | G06F 3/1257 |
| | | | 358/1.15 |
| 2017/0223199 A1 * | 8/2017 | Maeda | H04N 1/00228 |
| 2018/0267755 A1 * | 9/2018 | Okazawa | G06F 3/121 |
| 2019/0369934 A1 * | 12/2019 | Inoue | H04N 1/32747 |
| 2020/0379695 A1 | 12/2020 | Inoue | |

FOREIGN PATENT DOCUMENTS

JP    2020-192730 A    12/2020

* cited by examiner

*Primary Examiner* — Huo Long Chen
(74) *Attorney, Agent, or Firm* — Scully, Scott, Murphy & Presser, P.C.

(57) ABSTRACT

An image forming device disclosed herein may comprise an image forming engine and a controller. The controller may be configured to: repeatedly send an inquiry request to a server, wherein in a case where the job execution response is received from the server, control the image forming engine to start image formation; and in the case where the job execution response is received from the server, establish a connection of server-push type with the server, wherein in a case where the server receives a job stop instruction from the terminal device, the server sends an image formation stop command to the image forming device by using the connection without receiving the inquiry request from the image forming device, wherein in a case where the image formation stop command is received from the server, the image formation is stopped.

11 Claims, 11 Drawing Sheets

(Registration Process)

(Case A3:Printer 10 Belongs to LAN 62(With Canceling Operation))

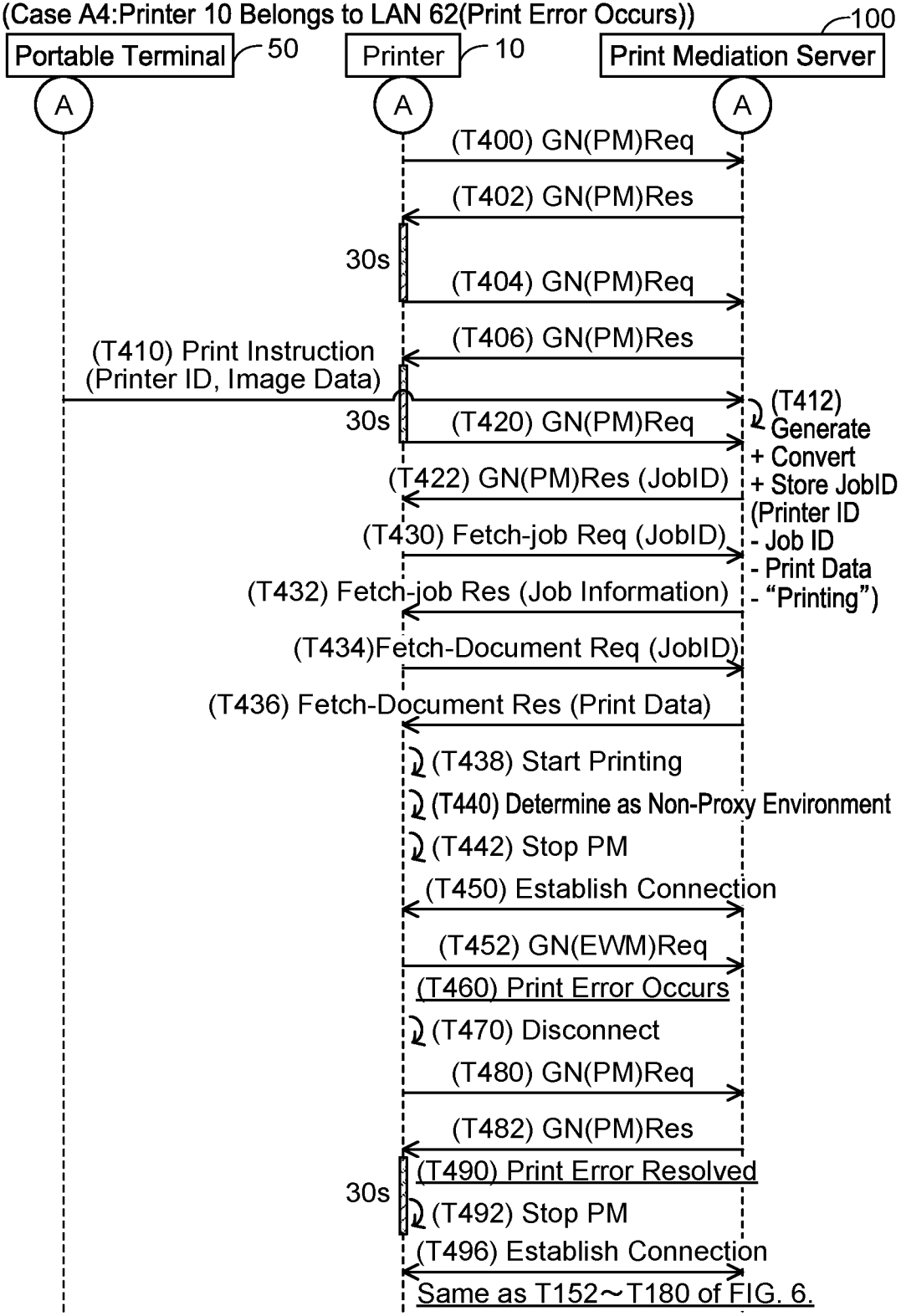

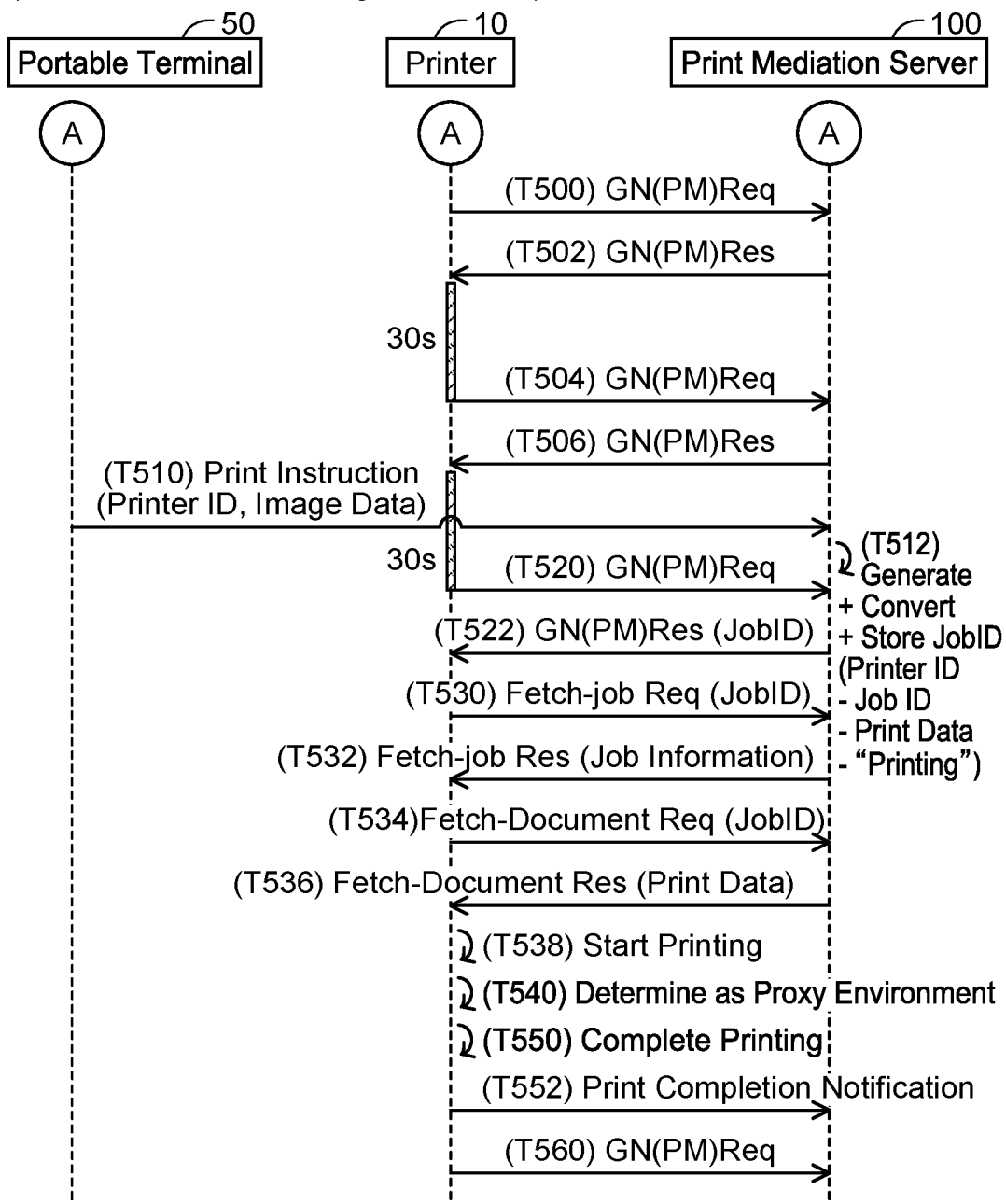

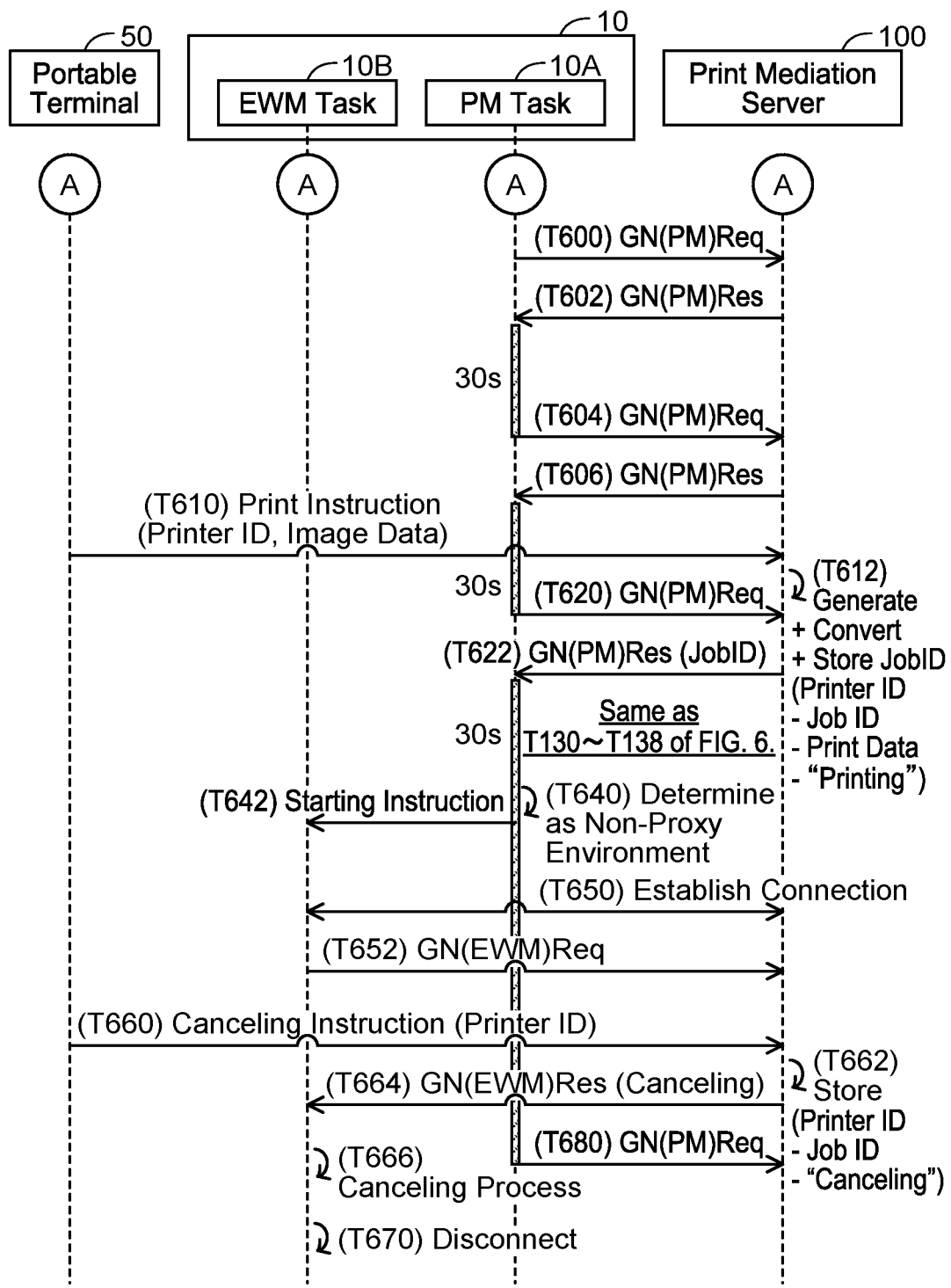

IMAGE FORMING DEVICE AND NON-TRANSITORY COMPUTER-READABLE RECORDING MEDIUM STORING COMPUTER-READABLE INSTRUCTIONS FOR IMAGE FORMING DEVICE

REFERENCE TO RELATED APPLICATION

This application claims priority from Japanese patent application No. 2022-100640 filed on Jun. 22, 2022. The entire content of the priority application is incorporated herein by reference.

BACKGROUND ART

A system including an image forming device, a cloud print server, and a client terminal is known. The image forming device repeatedly sends an event confirmation request to the cloud print server. When the cloud print server receives a print job sending command from the client terminal, the cloud print server sends an event confirmation response indicating that there is a print job to the image forming device in response to the event confirmation request. Accordingly, the image forming device executes the print job.

DESCRIPTION

Summary

In the conventional technique, no consideration is given to the cloud print server receiving a command for stopping execution of the print job from the client terminal. In the present disclosure, a technique that enables an image forming device to quickly stop image formation is provided.

An image forming device disclosed herein may comprise an image forming engine and a controller. The controller may be configured to: repeatedly send an inquiry request to a server, wherein in a case where the server receives a job execution instruction from a terminal device, the server sends a job execution response to the image forming device in response to the inquiry request received from the image forming device, and the job execution response indicates that a job is to be executed; in a case where the job execution response is received from the server, control the image forming engine to start image formation; and in the case where the job execution response is received from the server, establish a connection of server-push type with the server, wherein in a case where the server receives a job stop instruction from the terminal device, the server sends an image formation stop command to the image forming device by using the connection without receiving the inquiry request from the image forming device, wherein in a case where the image formation stop command is received from the server, the image formation is stopped.

According to the above configuration, the image forming device establishes a server-push type connection with the server in the case where the job execution response is received from the server. Since the connection is established, the server can send the image formation stop command to the image forming device using the connection without receiving the inquiry request from the image forming device in the case where the server receives the job stop instruction from the terminal device. Therefore, the image forming device can quickly receive the image formation stop command from the server as compared to the configuration in which the above-described connection is not established in response to receipt of the job execution response from the server. This enables the image forming device to quickly stop the image formation.

A computer program for implementing the image forming device above, a computer-readable recording medium storing the computer program, and a method executed by the image forming device are also novel and useful. Further, a system including the image forming device above and other device(s) (e.g., a server, a terminal device) is also novel and useful.

FIG. 9 illustrates a sequence diagram of Case A4.

FIG. 10 illustrates a sequence diagram of Case B.

FIG. 11 illustrates a sequence diagram of a second embodiment.

Figure 1:
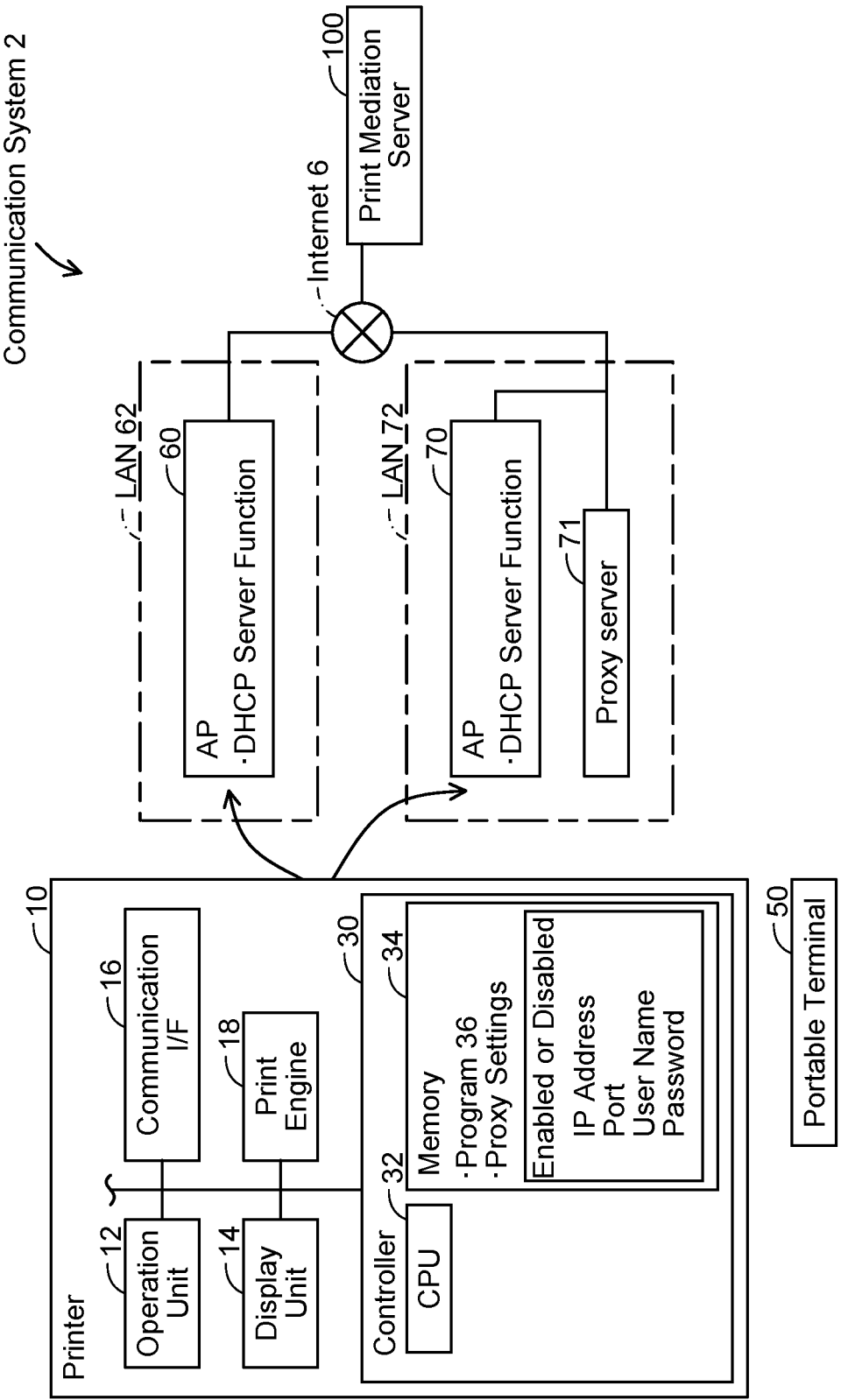
FIG. 1 illustrates a configuration of a communication system.

FIRST EMBODIMENT (Configuration of Communication System 2; FIG. 1)

As illustrated in FIG. 1, a communication system 2 includes a printer 10, a portable terminal 50, a plurality of access points (hereinafter referred to as "AP (access point)") 60 and 70, and a print mediation server 100. The printer 10 can selectively belong to a Local Area Network (LAN) 62 in which an AP 60 operates as a parent station, or to a LAN 72 in which the AP 70 operates as a parent station. The print mediation server 100 is connected to the Internet 6. When the printer 10 belongs to the LAN 62 or the LAN 72, the printer 10 can communicate with the print mediation server 100 via the AP 60 or the AP 70. In a modification, the LAN 62 and the LAN 72 may be wired LANs instead of wireless LANs. When the portable terminal 50 belongs to the LAN 62 or the LAN 72, the portable terminal 50 can communicate with the printer 10 and the print mediation server 100 via the AP 60 or the AP 70. In a modification, the portable terminal 50 may communicate with the print mediation server 100 using cellular communication such as 3G, 4G, or 5G.

(Configuration of Printer 10)

The printer 10 is a peripheral device configured to execute a printing function (e.g., a peripheral device of the portable terminal 50). The printer 10 includes an operation unit 12, a display unit 14, a communication interface 16, a print engine 18, and a controller 30. Each of the units 12 to 30 is connected to a bus line (not illustrated).

The operation unit 12 includes a plurality of buttons. The display unit 14 is a display for displaying various kinds of information. The display unit 14 also functions as a so-called touch screen (i.e., an operation unit operated by a user). The communication interface 16 is an interface for connecting to the LAN 62 or the LAN 72. The print engine 18 is a printing mechanism of an ink jet scheme, a laser scheme, or the like.

The controller 30 includes a CPU 32 and a memory 34. The CPU 32 executes various processes in accordance with a program 36 stored in the memory 34. The memory 34 is configured of a volatile memory, a non-volatile memory, and the like. The memory 34 stores proxy settings in addition to the program 36 described above.

The proxy settings include flag information indicating one of "enabled" indicating that the proxy server 71 is used and "disabled" indicating that the proxy server 71 is not used. The proxy settings may further include a plurality of setting values for using the proxy server 71. The plurality of setting values includes an IP address of the proxy server 71, a port number used for communication with the proxy server 71, a user name, and a password. The flag information and each of the setting values are stored in the memory 34 in response to these being input to the printer 10 by the user.

(Configurations of APs 60,70)

Each of the APs 60,70 has a Dynamic Host Configuration Protocol (DHCP) server function. Therefore, the AP 60 and AP 70 can assign an IP address to a device which belongs to the LAN 62 and LAN 72, respectively. The proxy server 71 is further provided in the LAN 72 formed by the AP 70.

(Configuration of Portable Terminal 50)

The portable terminal 50 is, for example, a mobile terminal device such as a mobile phone, a smartphone, a PDA, or a tablet PC. In a modification, a stationary PC, a notebook PC, or the like may be used instead of the portable terminal 50. Hereinafter, the portable terminal 50 will be referred to as "terminal 50".

(Configuration of Print Mediation Server 100)

The print mediation server 100 is a server that provides a so-called cloud print service. In the present embodiment, the print mediation server 100 is not a server installed by a vendor of the printer 10, but a server installed by a provider providing the cloud print service. In a modification, the print mediation server 100 may be a server installed by the vendor of the printer 10. The print mediation server 100 generates print data by converting image data received for example from the terminal 50, and sends the print data to the printer 10. Hereafter, the print mediation server 100 will be referred to as "server 100".

Figure 2:
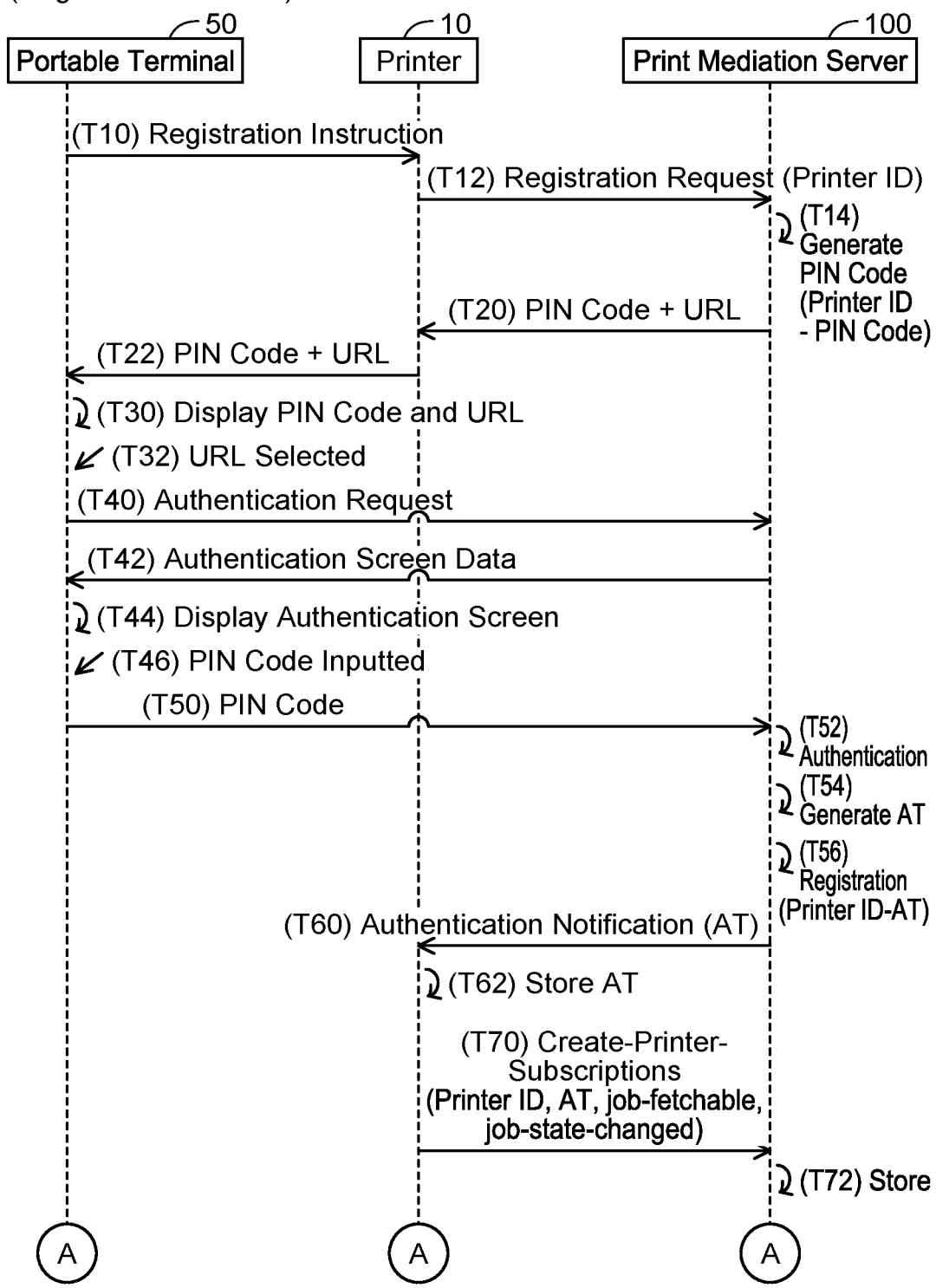
FIG. 2 illustrates a sequence diagram of a registration process.

(Registration Process: FIG. 2)

Referring to FIG. 2, a process for registering information related to the printer 10 in the server 100 for the printer 10 to receive the cloud print service from the server 100 will be described. In the initial state of FIG. 2, the printer 10 and the terminal 50 belong to the same LAN (i.e., the LAN 62 or the LAN 72). When the printer 10 belongs to the LAN 62, the printer 10 communicates with the terminal 50 and the server 100 using the AP 60. When the printer 10 belongs to the LAN 72, the printer 10 communicates with the terminal 50 by using the AP 70, and communicates with the server 100 by further using the proxy server 71. In FIG. 2, however, the AP 60, the AP 70 and the proxy server 71 are not illustrated. These devices are also omitted from the sequence diagrams of FIG. 6 and the subsequent figures.

In the following descriptions, when a process executed by of the CPU 32 of the printer in accordance with the program 36 is described, not the CPU 32 but the printer 10 is described as a subject of an action. All the communication below executed by the printer 10 is executed via the communication interface 16. Therefore, in the following description, a phrase "via the communication interface 16" will be omitted when a process related to the communication is described.

In response to accepting an operation from the user (not illustrated), the terminal 50 accesses, for example, a web server in the printer 10. Then, in response to further receiving an operation for the printer 10 to receive the cloud print service from the user, the terminal 50 sends a registration instruction to the printer 10 in T10.

When the printer 10 receives the registration instruction from the terminal 50 in T10, the printer 10 sends a registration request including a printer ID that is information for identifying the printer 10 to the server 100 in T12.

When the server 100 receives the registration request from the printer 10 in T12, the server 100 generates a PIN code in T14 and stores the generated PIN code in association with the printer ID included in the registration request. Then, in T20, the server 100 sends the PIN code and a login Uniform Resource Locator (URL) to the printer 10. The login URL is information indicating a location of authentication screen data (to be described later) in the server 100.

When the printer 10 receives the PIN code and the URL from the server 100 in T20, the printer 10 sends them to the terminal 50 in T22.

When the terminal 50 receives the PIN code and the URL from the printer 10 in T22, the terminal 50 displays them in T30. Then, in T32, when the terminal 50 accepts an operation to select the URL from the user, the terminal 50 sends an authentication request including the URL to the server 100 in T40.

When the server 100 receives the authentication request from the terminal 50 in T40, the server 100 sends the authentication screen data specified by the URL included in the authentication request to the terminal 50 in T42. The authentication screen data is data representing an authentication screen for inputting a PIN code.

When the terminal 50 receives the authentication screen data from the server 100 in T42, the terminal 50 displays the authentication screen represented by the authentication screen data in T44. Next, the terminal 50 accepts input of the PIN code displayed in T30 from the user in T46. In this case, in T50, the terminal 50 sends the inputted PIN code to the server 100.

When the server 100 receives the PIN code from the terminal 50 in T50, the server 100 executes authentication of the received PIN code in T52. Specifically, the server 100 determines whether the received PIN code has already been stored. When the server 100 determines that the received PIN code has already been stored, that is, when the authentication succeeds, the server 100 generates an access token (hereinafter referred to as an AT (Access Token) which is a unique character string in T54. Next, in T56, the server 100 identifies the printer ID associated with the received PIN code (see T14), and stores the identified printer ID and the generated AT in association with each other. Then, in T60, the server 100 sends an authentication notification including the generated AT to the printer 10.

When the printer 10 receives the authentication notification from the server 100 in T60, the printer 10 stores the AT included in the authentication notification in the memory 34 in T62. The printer 10 then sends Create-Printer-Subscriptions (hereinafter referred to as "CPS") to the server 100 in T70. The CPS is a command for registering a new event in the server 100 as Subscriptions. The CPS includes the printer ID, the AT stored in T62, a Job-Fetchable, and a Job-State-Changed. The Job-Fetchable is a command for causing the server 100 to monitor receipt of a print instruction and to notify the printer 10 that the print instruction has been received. The Job-State-Changed is a command for causing the server 100 to monitor a change of a status of a print job and to notify the printer 10 that the status of the print job has been changed.

When the server 100 receives the CPS from the printer 10 in T70, the server 100 executes authentication of the AT included in the CPS. When the authentication succeeds, the server 100 stores the job-Fetchable and the job-State- Changed in association with the printer ID included in the CPS in T72. Consequently, in response to receiving a print instruction including the printer ID of the printer 10, the server 100 notifies the printer 10 of the receipt of the print instruction, and in response to receiving a job change instruction (e.g., a canceling instruction) including the printer ID of the printer 10, the server 100 notifies the printer 10 of the receipt of the job change instruction. As a result, the registration process is completed.

Figure 3:
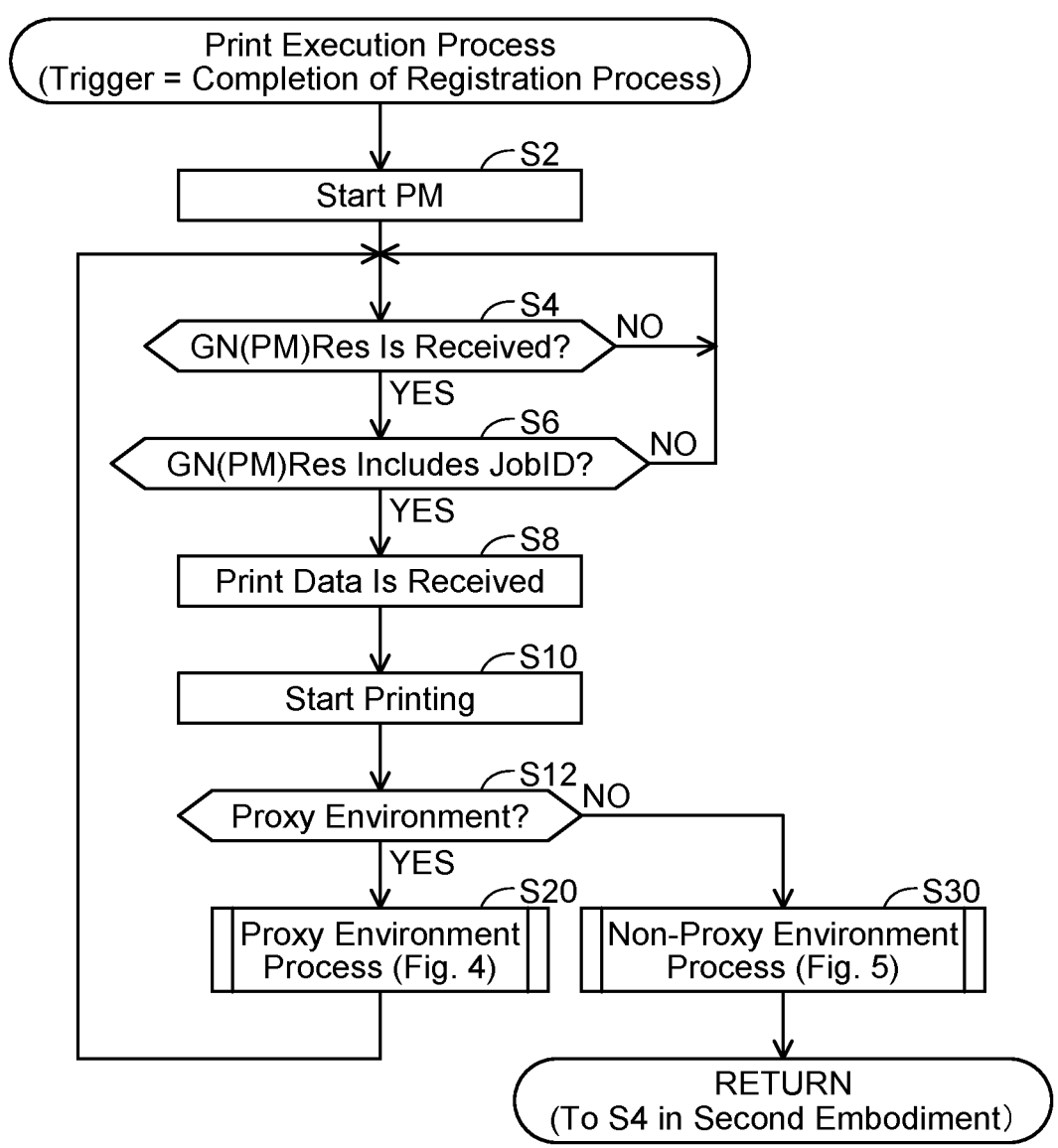
FIG. 3 is a flowchart of a print execution process.

(Print Execution Process: FIG. 3)

Next, referring to FIG. 3, a print execution process executed by the CPU 32 of the printer 10 will be described. A start of the process of FIG. 3 is triggered by completion of the registration process. Further, the start of the process of FIG. 3 is triggered by the power of the printer 10 being turned off after completion of the registration process and then the power of the printer 10 being turning on.

In S2, the printer 10 starts its operation in a Polling Mode (hereinafter referred to as "PM"). The PM is a mode for receiving print data from the server 100 by repeatedly sending a polling signal to the server 100. When the printer 10 starts the operation in the PM, the printer 10 sends a Get-Notification(Polling Mode)Request (hereinafter referred to as "GN(PM)Req") to the server 100. The GN(PM)Req corresponds to the aforementioned polling signal. The GN(PM)Req includes the printer ID of the printer 10. The same applies to a Get-Notification(Polling Mode)Response (hereinafter referred to as "GN(PM)Res") to be described later.

In S4, the printer 10 monitors receipt of the GN(PM)Res from server 100. When the printer 10 receives the GN(PM) Res from the server 100, the printer 10 determines YES in S4 and proceeds to S6.

In S6, the printer 10 determines whether the GN(PM)Res includes a Job ID or not. When the printer 10 determines that the GN(PM)Res includes a Job ID (YES in S6), the printer 10 proceeds to S8. When the printer 10 determines that the GN(PM)Res does not include a Job ID (NO in S6), the printer 10 returns to S4. The GN(PM)Res includes interval information indicating an interval between sending of the GN(PM)Req and the next GN(PM)Req. In the present embodiment, the interval information indicates 30s (seconds). In a modification, the interval information may indicate an interval greater than 30 s or less than 30 s. When the printer 10 determines that the GN(PM)Res does not include a Job ID (NO in S6), the printer 10 sends the GN(PM)Req to the server 100 when 30 s indicated by the interval information included in the GN(PM)Res elapses. The printer 10 then monitors receipt of the GN(PM)Res from the server 100 in S4.

In S8, the printer 10 executes various communication with the server 100 to receive, from the server 100, print data identified by the Job ID included in the GN(PM)Res.

In S10, the printer 10 starts printing using the received print data. Specifically, the printer 10 (i.e., the CPU 32) supplies the print data to the print engine 18 and starts printing in accordance with the print data.

In S12, the printer 10 determines whether the printer 10 is in a proxy environment or a non-proxy environment. The proxy environment is an environment in which the printer 10 communicates with device(s) on the Internet 6 using the proxy server 71 (that is, a situation in which the printer 10 belongs to the LAN 72). The non-proxy environment is an environment in which the printer 10 communicates with device(s) on the Internet 6 without using the proxy server 71 (that is, a situation in which the printer 10 belongs to the LAN 62).

When the flag information included in the proxy settings in the memory 34 indicates "enabled" and the setting values (an IP address, a port number, and the like) are stored as the proxy settings, the printer 10 determines that the printer 10 is in the proxy environment (YES in S12).

On the other hand, when the flag information indicates "disabled" or when the flag information indicates "enabled" but the setting values are not stored, the printer 10 determines whether a URL of a Web Proxy Auto-Discovery Protocol (WPAD) file is stored in the memory 34 or not. When the WPAD file is stored in the memory 34, the printer 10 determines that the printer 10 is in the proxy environment (YES in S12) while when the WPAD file is not stored in the memory 34, the printer 10 determines that the printer 10 is in the non-proxy environment (NO in S12).

The WPAD will be described. When the printer 10 belongs to the LAN 62 or the LAN 72, the printer 10 requests the AP 60 or the AP 70 to assign an IP address to the printer 10. Since the AP 60 or the AP 70 has the DHCP server function, it automatically assigns the IP address to the printer 10. When the proxy server 71 is in the LAN 72, the AP 70 also sends the URL of the WPAD file to the printer 10 when the AP 70 assigns the IP address to the printer 10. The WPAD file is a file indicating information about the proxy server 71. Thus, when the printer 10 receives the URL of the WPAD file from the AP 71, the printer 10 can determine that the proxy server 71 is in the LAN 72, that is, the printer 10 is in the proxy environment.

Based on the above process, when the printer 10 determines that the printer 10 is in the proxy environment (YES in S12), the printer 10 proceeds to S20, while the printer 10 proceeds to S30 when the printer 10 determines that the printer 10 is in the non-proxy environment (NO in S12).

Figure 4:
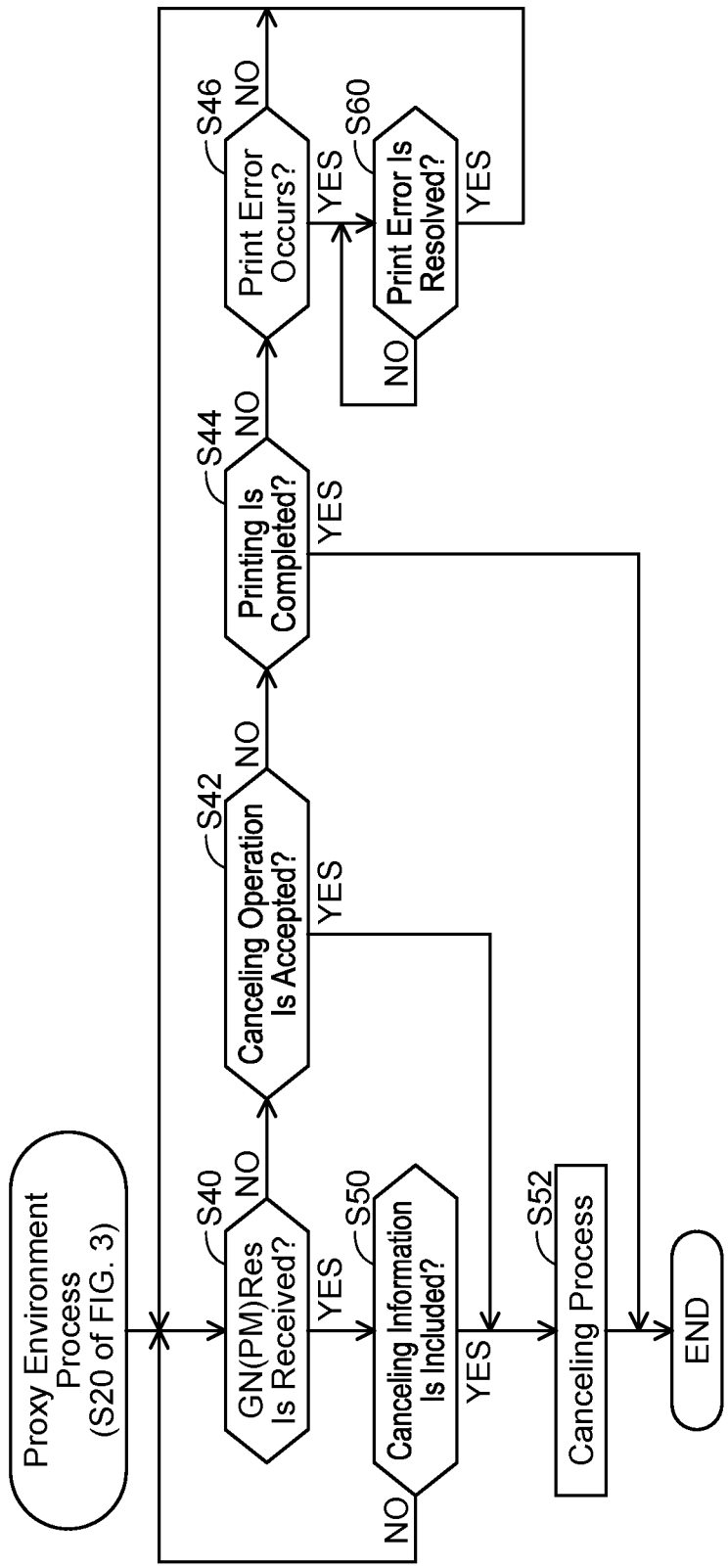
FIG. 4 illustrates a flowchart of a proxy environment process.

In S20, the printer 10 executes a proxy-environment process (see FIG. 4). When the process of S20 is completed, the printer 10 returns to S4.

Figure 5:
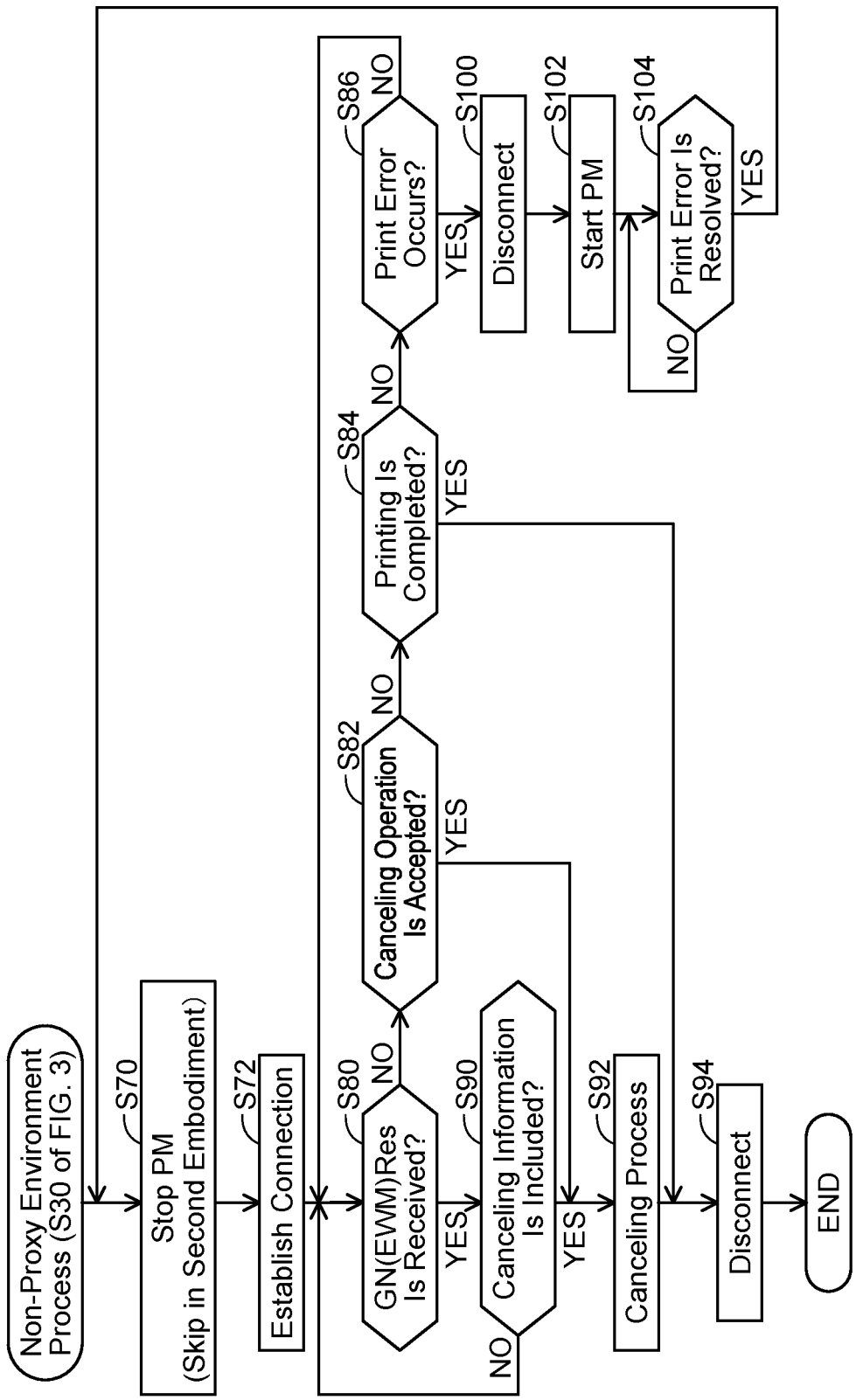
FIG. 5 illustrates a flowchart of a non-proxy environment process.

In S30, the printer 10 executes a non-proxy environment process (see FIG. 5). When the process of S30 is completed, the printer 10 returns to S2.

(Proxy Environment Process: FIG. 4)

With reference to FIG. 4, the proxy environment process of S20 of FIG. 3 will be described. In the proxy environment process, the printer 10 maintains the PM without operating in an Event Wait Mode (hereinafter referred to as "EWM"). That is, the printer 10 periodically sends the GN(PM)Req to the server 100 (every 30 seconds in the present embodiment).

In S40, the printer 10 monitors receipt of the GN(PM)Res from server 100. When the printer 10 receives the GN(PM) Res, the printer 10 determines YES in S40 and proceeds to S50.

In S42, the printer 10 monitors acceptance of a canceling operation from the user. The canceling operation may be an operation on a button constituting the operation unit 12 or may be an operation on the display unit 14 functioning as a touch screen. When the printer 10 receives the canceling operation from the user, the printer 10 determines YES in S42 and proceeds to S52.

In S44, the printer 10 monitors completion of the printing started in S10 of FIG. 3. The printer 10 determines YES in S44 when the printer 10 obtains, from the print engine 18, information indicating that the printing has been completed, the printer 10 ends the process of FIG. 4.

In S46, the printer 10 monitors occurrence of a print error. The print error is, for example, jamming of print paper, shortage of print paper, exhaustion of a coloring material for printing, and/or the like. When the printer 10 (i.e., the CPU 32) obtains information indicating that the print error has occurred from the print engine 18, the printer 10 determines YES in S46 and proceeds to S60.

In S60, the printer 10 monitors for the print error to be resolved. When the printer 10 (i.e., the CPU 32) obtains information indicating that the print error has been resolved from the print engine 18, the printer 10 determines YES in S60 and returns to the monitoring processes of S40 to S46.

In S50, the printer 10 determines whether the GN(PM) Res received in S40 includes canceling information. The canceling information is information sent from the server 100 to the printer 10 when a canceling instruction is sent from the terminal 50 to the server 100 in response to the user operating the terminal 50. When the GN(PM)Res includes the canceling information, the printer 10 determines YES in S50 and proceeds to S52. On the other hand, when the GN(PM)Res does not include the canceling information, the printer 10 determines NO in S50 and returns to the monitoring processes of S40 to S46.

In S52, the printer 10 executes a canceling process. The canceling process includes supplying, to the print engine 18, an instruction indicating that printing is to be cancelled, and deleting the received print data. Consequently, the printing is stopped in the print engine 18. When the process of S52 ends, the process of FIG. 4 ends.

(Non-Proxy Environment Process: FIG. 5)

With reference to FIG. 5, the non-proxy environment process of S30 of FIG. 3 will be described. In the non-proxy environment process, the printer 10 operates in the EWM instead of the PM.

In S70, the printer 10 stops the operation in the PM. That is, the printer 10 stops sending the GN(PM)Req. As a result, the printer 10 does not operate in parallel in the PM and the EWM, so that it is possible to suppress increase in the process load and the communication load.

In S72, the printer 10 operates in the EWM. Specifically, the printer 10 uses the stored AT (see T62 of FIG. 2) to establish with the server 100 a connection which conforms to Hypertext Transfer Protocol (HTTP). This connection is called a so-called constant connection, and is a connection that enables sending of a signal from the server 100 to the printer 10 without sending of a signal from the printer 10 to the server 100. That is, this connection is a connection for executing communication of server-push type. After establishment of the connection, the printer sends a Get-Notification(Event Wait Mode)Request (hereinafter referred to as "GN(EWM)Req") to the server 100. The GN(EWM)Req is a signal for, when the server 100 receives the canceling instruction from the terminal 50, requesting the server 100 to send a notification about the receipt of the canceling instruction to the printer 10.

In S80, the printer 10 monitors receipt of the GN(EWM) Res from server 100. When the printer 10 receives the GN(EWM)Res, the printer 10 determines YES in S80 and proceeds to S90.

S82, S84, S86 are the same as S42, S44, S46 of FIG. 4, respectively. When YES is determined in S82, the printer 10 proceeds to S92, when YES is determined in S84, the printer 10 proceeds to S94, and when YES is determined in S86, the printer 10 proceeds to S100.

In S90, the printer 10 determines whether the GN(EWM) Res received in S80 includes canceling information. When the GN(EWM)Res includes the canceling information, the printer determines YES in S90 and proceeds to S92. On the other hand, when the GN(EWM)Res does not include the canceling information, the printer 10 determines NO in S90, and returns to the monitoring processes of S80 to S86.

In S92, the printer 10 executes the canceling process. S92 is the same as S52 of FIG. 4. As a result, printing is stopped in the print engine 18.

In S94, the printer 10 disconnects the connection established in S72. When the process of S94 ends, the process of FIG. 5 ends. In this case, the printer 10 returns to S2 of FIG. 3 and operates again in the PM. Consequently, the printer 10 can resume repetitive sending of the GN(PM)Req to the server 100 and receive the GN(PM)Res from the server 100.

As described above, in the present embodiment, when the printer 10 receives the GN(PM)Res including the Job ID from the server 100 (YES in S6), the printer 10 establishes the server push-type connection with the server 100 (S72). Since this connection is established, when the server 100 receives the canceling instruction from the terminal 50, the server 100 can send the GN(EWM)Res including the canceling information to the printer 10 using this connection without receiving the GN(PM)Req from the printer 10. Accordingly, the printer 10 can quickly receive the canceling information from the server 100 as compared to the configuration in which the above-described connection is not established in response to receipt of the GN(PM)Res including the Job ID from the server 100. Thus, the printer 10 can quickly stop printing.

When the GN(EWM)Res includes the canceling information (YES in S90), when the canceling operation is accepted (YES in S82), or when the printing is completed (YES in S84), the printer 10 disconnects the connection (S94). Consequently, the printer 10 does not need to send a signal for maintaining the connection to the server 100, and as a result, the processing load and the communication load on the printer 10 can be reduced.

In addition, in S100, the printer 10 disconnects the connection established in S72. When a print error occurs, printing is interrupted, so that the printer 10 does not need to quickly cancel the printing. In such a situation, since the printer 10 disconnects the connection, the processing load and the communication load on the printer 10 can be reduced.

Next, in S102, the printer 10 starts operating in the PM. That is, the printer 10 periodically sends the GN(PM)Req to the server 100.

In S104, the printer 10 monitors for the print error to be resolved. When the print error is resolved, the printer 10 determines YES in S104 and returns to S70. In this case, the printer 10 stops the operation in the PM (S70) and reestablishes the connection with the server 100 (S72). Consequently, the printer 10 can quickly receive the canceling information from the server 100 after the print error is resolved, and the printing is resumed.

As a result of studies conducted by the inventors of the present disclosure, it has been found that, when the printer 10 operates in the EWM when it is in the proxy-environment, there is a risk that the printer 10 cannot receive a notification from the server 100. Thus, the printer 10 keeps operating in the PM without operating in the EWM in the proxy-environment (i.e., without establishing the connection with the server 100) (see FIG. 4). Accordingly, the printer 10 can suitably receive a notification (e.g., the GN(PM)Res including the canceling information) from the server 100 in the proxy-environment. On the other hand, the printer 10 operates in the EWM in the non-proxy environment (i.e., establish the connection with the server 100) (see FIG. 5). This allows the printer 10 to quickly receive a notification (e.g., the GN(PM)Res including canceling information) from the server 100.

(Specific Cases: FIG. 6 to FIG. 10)

Figure 6:
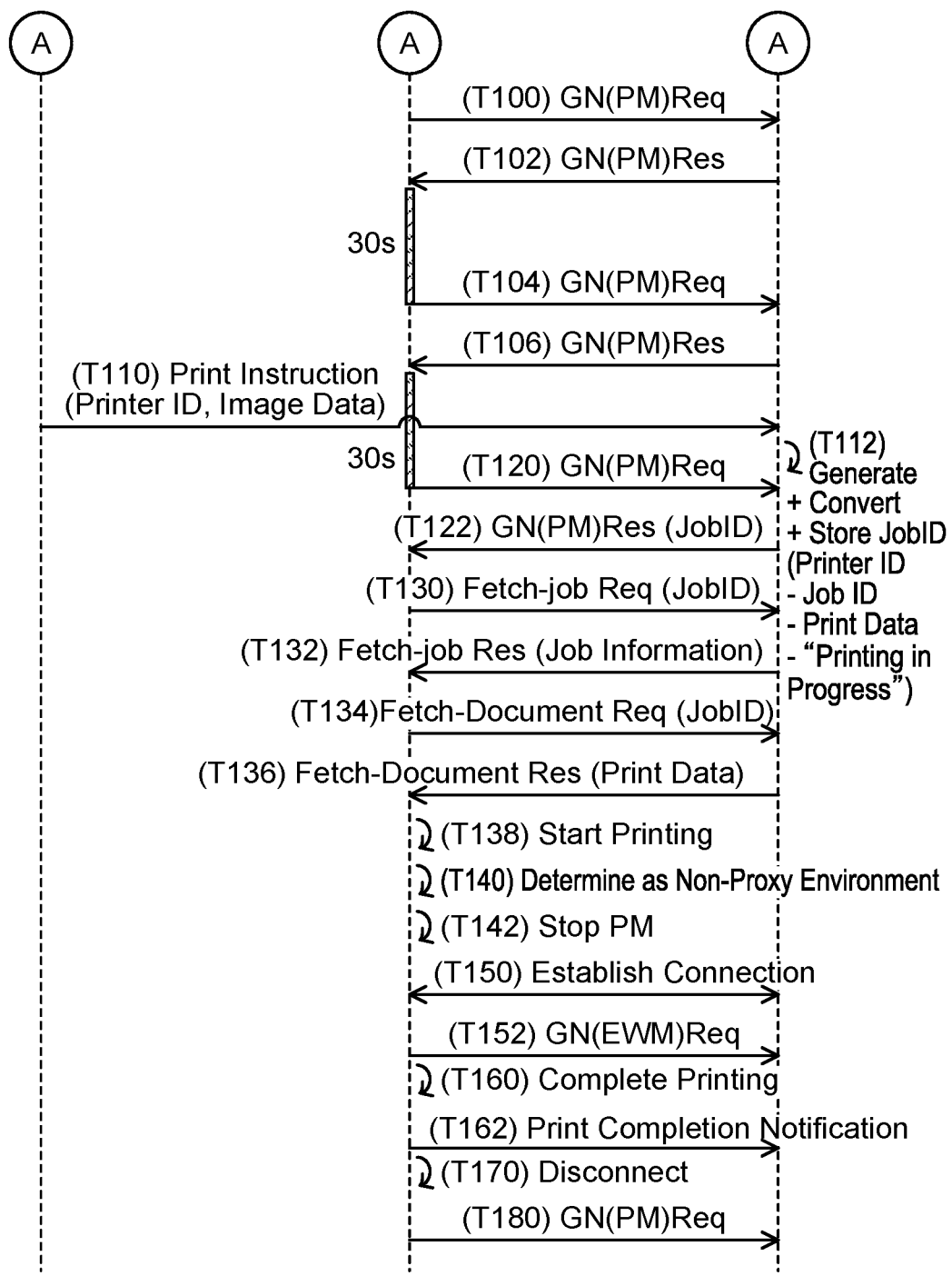
FIG. 6 illustrates a sequence diagram of Case A1.
Figure 7:
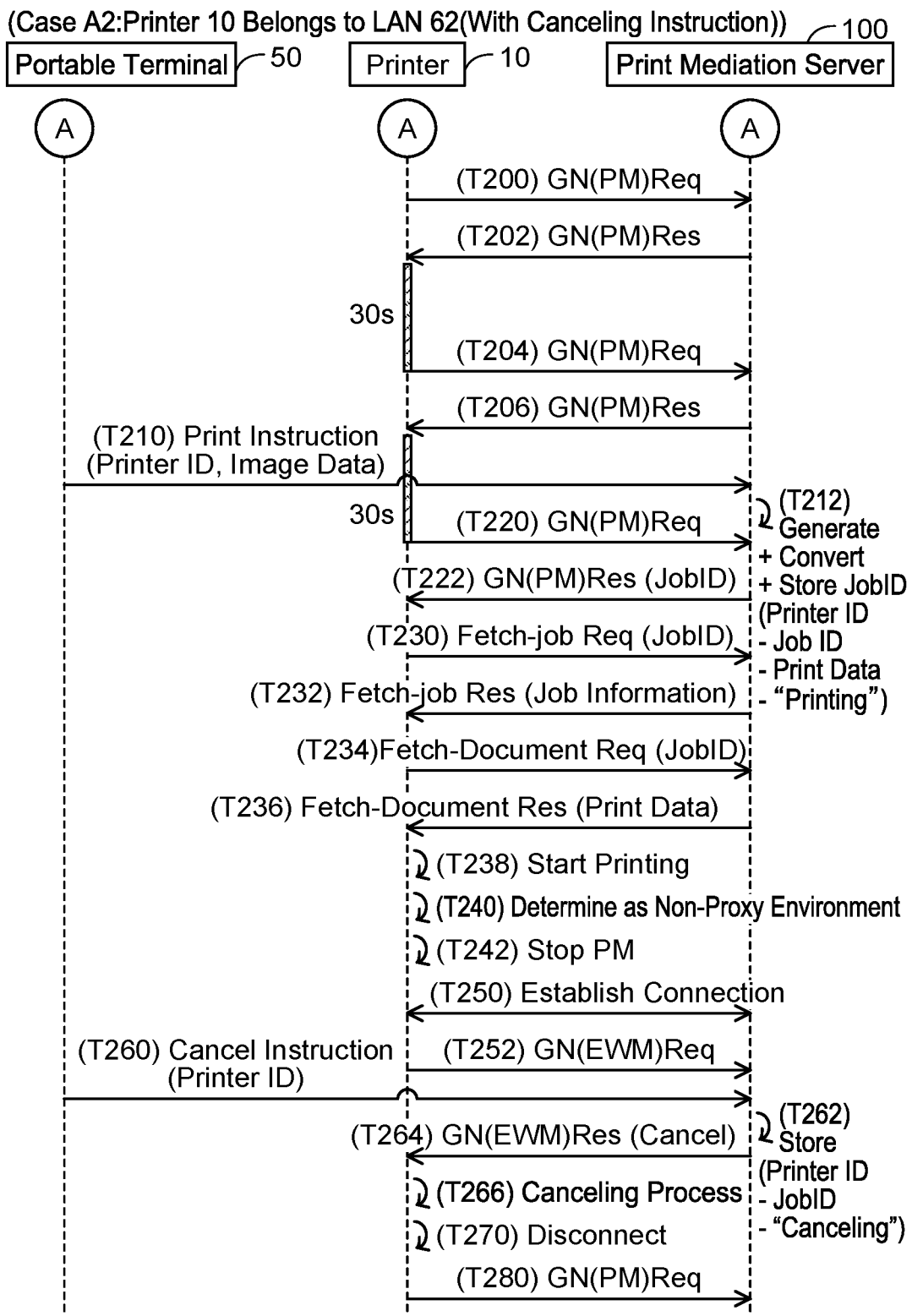
FIG. 7 illustrates a sequence diagram of Case A2.
Figure 8:
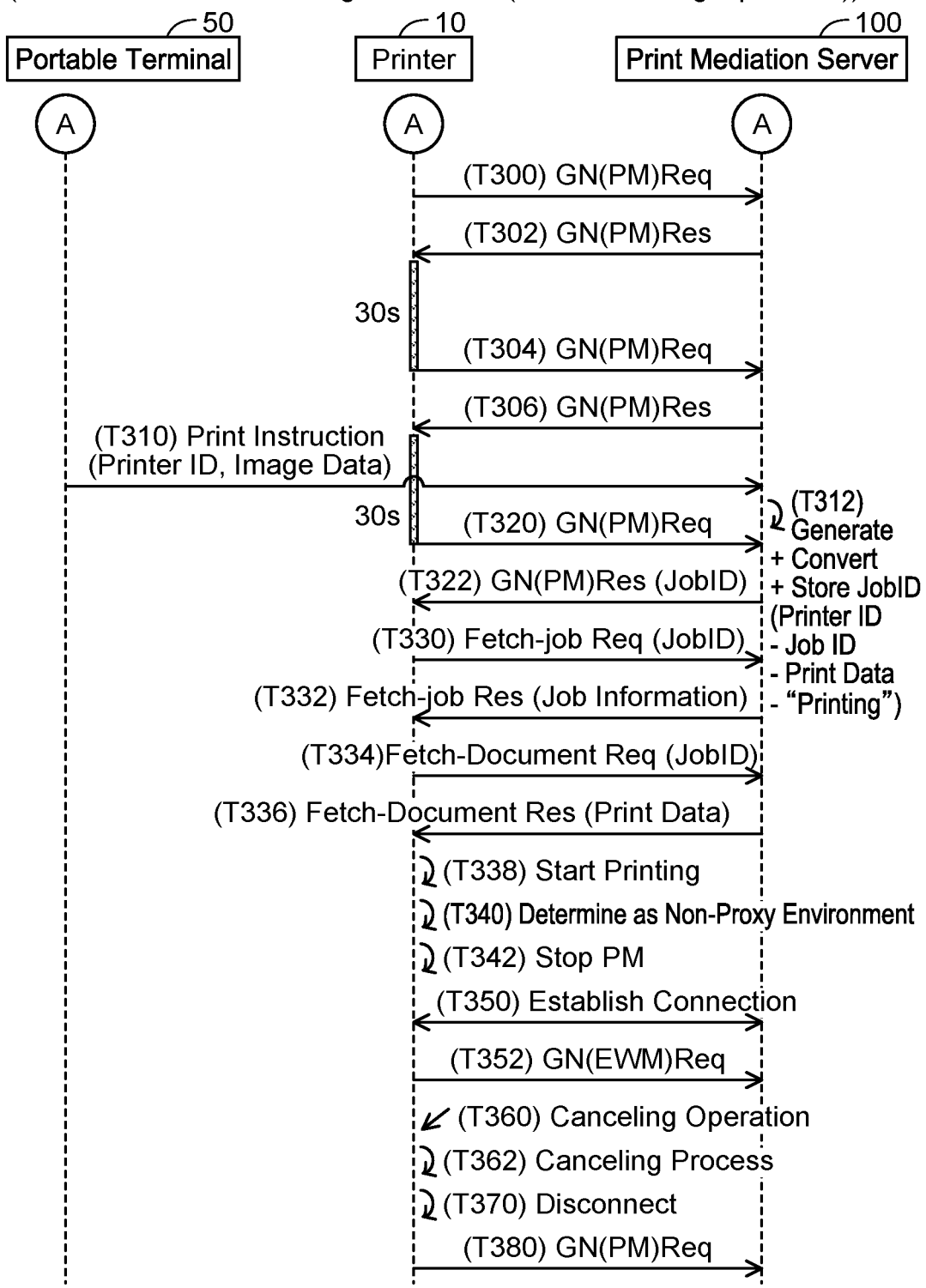
FIG. 8 illustrates a sequence diagram of Case A3.

Next, specific cases realized by the processes of FIGS. 3 to 5 will be described with reference to FIGS. 6 to 10. Cases A1 to A4 in FIGS. 6 to 9 are cases in which the printer 10 belongs to the LAN 62. Case A1 of FIG. 6 is a case in which the printing process is completed with no error. Case A2 of FIG. 7 is a case in which the print canceling instruction is sent from the terminal to the server 100. Case A3 of FIG. 8 is a case in which the canceling operation for printing is performed on the printer 10. Case A4 of FIG. 9 is a case in which the print error occurs. Case B of FIG. 10 is a case in which the printer 10 belongs to the LAN 72.

(Case A1: FIG. 6)

First, Case A1 of FIG. 6 will be described. When the process of FIG. 2 is completed, the printer 10 starts the operation in the PM (S2 of FIG. 3). In this case, in T100, the printer 10 sends the GN(PM)Req including the printer ID of the printer 10 to the server 100.

When the server 100 receives the GN(PM)Req from the printer 10 in T100, the server 100 determines whether there is a print job to be executed by the printer 10 identified by the printer ID included in the GN(PM)Req. Since there is no print job at this stage, the server 100 sends the GN(PM)Res not including a Job ID to the printer 10 in T102.

When the printer 10 receives the GN(PM)Res from the server 100 in T102 (YES in S4), the printer 10 determines that this GN(PM)Res does not include a Job ID (NO in S6). Then, the printer 10 waits for 30 s indicated by the interval information included in the GN(PM)Res. After has elapsed, the printer 10 sends the GN(PM)Req to the server 100 in T104, and receives the GN(PM)Res that does not include a Job ID from the server 100 in T106 (YES in S4, NO in S6). As described above, the printer 10 repeatedly sends the GN(PM)Req to the server 100 in response to 30s elapsing after the printer 10 receives the GN(PM)Res that does not include a Job ID from the server 100. Consequently, the printer 10 can repeatedly send the GN(PM)Req to the server 100 at the interval in accordance with the instruction from the server 100.

Although not illustrated, the terminal 50 receives a print operation for causing the printer 10 to execute printing from the user. The print operation includes an operation of designating the printer ID of the printer 10 and an operation of designating image data representing an image to be printed. When the terminal 50 receives the print operation from the user, the terminal 50 sends a print instruction including the designated printer ID and the designated image data to the server 100 in T110.

When the server 100 receives the print instruction from the terminal 50 in T110, the server 100 generates a Job ID that is an ID for identifying a print job in T112. Further, the server 100 converts the image data included in the print instruction to generate print data having a data format that can be interpreted by the printer 10. Then, the server 100 stores the printer ID included in the print instruction, the generated Job ID, the generated print data, and the status "printing in progress" in association with each other.

Thereafter, when the server 100 receives the GN(PM)Req from the printer 10 in T120, the server 100 determines that there is a print job to be executed by the printer 10 since the Job ID and the like are stored in association with the printer ID included in this GN(PM)Req (see T112). In this case, in T122, the server 100 sends the GN(PM)Res including this Job ID to the printer 10.

In T122, when the printer 10 receives the GN(PM)Res including the Job ID from the server 100 (YES in S4, YES in S6), the printer 10 sends a Fetch-job Request including this Job ID to the server 100 in T130 and receives a Fetch-job Response from the server 100 in T132. The Fetch-job Response includes job information indicating print conditions (e.g., sheet size, number of colors, number of copies, and the like).

In T134, the printer 10 sends a Fetch-Document Request to the server 100, and in T136, the printer 10 receives a Fetch-Document Response including the print data generated in T112 from the server 100 (S8). In this case, in T138, the printer 10 (i.e., the CPU 32) controls the print engine 18 (specifically, supplies the job information and the print data to the print engine 18) and starts printing according to the job information and the print data (S10).

In the present case, the printer 10 belongs to the LAN 62. Thus, in T140, the printer 10 determines that the printer 10 is in the non-proxy environment (NO in S12). Therefore, the printer 10 executes the non-proxy environment process (see FIG. 5).

In T142, the printer 10 stops the operation in the PM (S70 in FIG. 5). The printer 10 then establishes the connection with the server 100 in T150 (S72). In T152, the printer 10 sends the GN(EWM)Req to the server 100.

In the present Case A1, the printer 10 completes the printing in T160 (YES in S84) without receiving the GN(PM)Res including the canceling information from the server 100 (NO in S80) or without accepting the canceling operation from the user (NO in S82). In this case, in T162, the printer 10 sends a print completion notification to the server 100. Consequently, the Job ID, the print data, and the status "printing in progress" associated with the printer ID are deleted in the server 100.

Then, in T170, the printer 10 disconnects the connection established in T150 (S94) and ends the operation in the EWM. In this case, the printer 10 resumes the operation in the PM (S2 in FIG. 3) and sends the GN(PM)Req to the server 100 in T180.

(Case A2: FIG. 7)

Next, Case A2 of FIG. 7 will be described. Processes of T200 to T252 are the same as the processes of T100 to T152 of FIG. 6.

Although not illustrated, the terminal 50 accepts the canceling operation for canceling the printing from the user. In this case, the terminal 50 sends the canceling instruction including the printer ID of the printer 10 to the server 100 in T260.

When the server 100 receives the canceling instruction from the terminal 50 in T260, the server 100 identifies the Job ID associated with the printer ID included in the canceling instruction (see T212) and deletes the print data associated with the identified Job ID in T262. Then, the server 100 stores the printer ID, the identified Job ID, and the status "canceling" in association with each other.

Here, the server 100 has already received the GN(EWM)Req from the printer 10 in T252. Thus, the server 100 identifies the Job ID and the status "canceling" associated with the printer ID of the printer 10 included in the received GN(EWM)Req (see T262), and sends the GN(EWM)Res including the canceling information to the printer 10 in T264.

When the printer 10 receives the GN(PM)Res including the canceling information from the server 100 in T264 (YES in S80 and YES in S90 of FIG. 5), the printer 10 executes the canceling process in T266 (S92). Consequently, the printing is stopped in the print engine 18. The subsequent processes T270 and T280 are the same as the processes of T170 and T180 of FIG. 6.

(Case A3: FIG. 8)

Next, Case A3 of FIG. 7 will be described. Processes of T300 to T352 are the same as the processes of T100 to T152 of FIG. 6.

In T360, the printer 10 accepts the canceling operation for canceling the printing from the user (YES in S82 of FIG. 5). In this case, the printer 10 executes the canceling process in T362 (S92) without receiving the GN(PM)Res including the canceling information. Consequently, the printing is stopped in the print engine 18. The subsequent processes of T370 and T380 are the same as the processes of T170 and T180 of FIG. 6.

(Case A4: FIG. 9)

Next, Case A4 of FIG. 9 will be described. Processes of T400 to T452 are the same as the processes of T100 to T152 of FIG. 6.

In T460, the print error occurs in the print engine 18 (YES in S86 of FIG. 5). In this case, the printer 10 disconnects the connection with the server 100 in T470 (S100). Next, the printer 10 starts the operation in the PM (S102), sends the GN(PM)Req to the server 100 in T480, and receives the GN(PM)Res from the server 100 in T482.

Thereafter, in response to the user performing an operation for resolving the print error (e.g., replenishing the print paper), the print error is resolved in T490 (YES in S104). In this case, the printer 10 stops the operation in the PM in T492 (S70) and reestablishes the connection with the server 100 in T496 (S72). Thereafter, the printer 10 executes the same processes as T152 to T180 of FIG. 6.

(Case B: FIG. 10)

Next, Case B of FIG. 10 will be described. Processes of T500 to T538 are the same as the processes of T100 to T138 of FIG. 6.

In T540, the printer 10 determines that the printer 10 is in the proxy-environment (YES in S12 of FIG. 3). Therefore, the printer 10 executes the proxy-environment process (see FIG. 4) and continues to operate in the PM without establishing the connection with the server 100.

When the printer 10 completes the printing in T550 (YES in S44 of FIG. 4), the printer sends a print completion notification to the server 100 in T552. The printer 10 continues to operate in the PM and sends the GN(PM)Req to the server 100 in T560.

(Corresponding Relationships)

The printer 10 and the print engine 18 are an example of "image forming device" and "image forming engine", respectively. The GN(PM)Req is an example of "inquiry request". The GN(PM)Res including the Job ID (see T122 of FIG. 6) is an example of "job execution response". The print instruction of T110 of FIG. 6 is an example of "job execution instruction". The canceling instruction of T260 of FIG. 7 is an example of "job stop instruction". The GN(EWM)Res including the canceling information (T264 of FIG. 7) is an example of "image formation stop command". The canceling operation of T360 of FIG. 8 is an example of "stop operation".

T100, T104 and T120 of FIG. 6 are examples of "repeatedly send an inquiry request to a server". T138, T150 of FIG. 6 are an example of "control the image forming engine to start image formation" and "establish a connection of server-push type with the server", respectively. T170 of FIG. 6, T270 of FIG. 7, T370 of FIG. 8, and T470 of FIG. 9 are examples of "disconnect the connection". T496 of FIG. 9 is an example of "reestablish the connection". S12 of FIG. 3 is an example of "determine whether the image forming device is in a proxy environment or a non-proxy environment".

SECOND EMBODIMENT: FIG. 11

Next, a second embodiment will be described. In the second embodiment, the printer does not execute S70 of FIG. 5 when the printer 10 receives the GN(PM)Res including a Job ID from the server 100 (YES in S4, YES in S6 of FIG. 3) and the printer 10 is in the non-proxy environment (NO in S12). That is, the printer 10 continues to operate in the PM. Therefore, the printer 10 operates in parallel in the PM and the EWM. Hereafter, a PM task for operating in the PM (in other words, a process thread) and an EWM task for operating in the EWM will be represented by reference signs 10A, 10B, respectively.

Processes of T600 to T640 are the same as the processes of T100 to T140 of FIG. 6 of the first embodiment, except that the PM task 10A and the EWM task 10B operate in parallel. The PM task 10A sends a starting instruction to the EWM task 10B in T642. Consequently, the EWM task 10B establishes the connection with the server 100 in T650 (S72 of FIG. 5). Then, the EWM task 10B sends a GN(EWM)Req to the server 100.

Processes of T660 to T664 are the same as the processes of T260 to T264 of FIG. 7. When the EWM task 10B receives the GN(EWM)Res including the canceling information from the server 100 in T664 (YES in S80, YES in S90), the EWM task 10B executes the canceling process in T666 (S92). As described above, the printer 10 can receive the GN(EWM)Res including the canceling information from the server 100 in T664 before sending the GN(PM)Req to the server 100 in T680. Therefore, the printer 10 can quickly execute the canceling process. The process of T670 is the same as the process of T270 of FIG. 7.

As described above, in the present embodiment, after the printer 10 receives the GN(PM)Res including the Job ID from the server 100 (T622), the printer 10 starts the operation in the EWM (T650) while continuing the operation in the PM (T680). This enables the printer 10 to operate in parallel in the PM and the EWM. By operating in the EWM, the printer 10 can quickly receive canceling information from the server 100. Further, even if an event which does not allow the printer 10 to communicate in the EWM occurs, the printer 10 operates in the PM, and thus can suitably receive the GN(PM)Res including the canceling information.

While specific examples of the present disclosure have been described above in detail, these examples are merely illustrative and place no limitation on the scope of the patent claims. The technology described in the patent claims also encompasses various changes and modifications to the specific examples described above. Modifications of the above embodiments are listed below.

(Modification 1) The above embodiments contemplate that the server 100 receives the canceling instruction from the terminal 50 (see Case A2 of FIG. 7). Alternatively, the server 100 may receive a pause instruction from the terminal 50 in T260 of FIG. 7. In this case, in T264, the server 100 sends the GN(EWM)Res including pause information to the printer 10. The printer 10 stops printing in T266. However, the printer 10 does not delete the print data. Thus, the printer 10 can resume the printing when the printer 10 receives, from the server 100, the GN(EWM)Res including information indicating that the printing is to be resumed. In the present modification, the pause instruction and the GN(EWM)Res including the pause information are an example of "job stop instruction" and "image formation stop command", respectively. In another modification, the server 100 may receive a priority printing instruction from the terminal 50 in T260 of FIG. 7. In this case, in T264, the server 100 sends the GN(EWM)Res including priority printing information to the printer 10. The printer 10 stops printing in T266. However, the printer 10 does not delete the print data. The printer 10 receives, from the server 100, new print data which is to be prioritized, and executes printing according to the new print data. Thereafter, the printer 10 resumes the stopped printing. In the present modification, the priority printing instruction and the GN(EWM)Res including the priority printing information are an example of the "job stop instruction" and the "image formation stop command", respectively.

(Modification 2) A scanner may be used instead of the printer 10. In this case, a scan mediation server is used instead of the print mediation server 100. In the present modification, processes are executed as follows. In T110 of FIG. 6, a scan instruction is communicated instead of the printing instruction. Neither T134 nor T136 is executed. In T138, scanning of document(s) is started. In T266 of FIG. 7 or T362 of FIG. 8, the scanning is canceled. When the scanning is completed in T160 of FIG. 6, the scanned data is sent from the scanner to the terminal 50 via the scan mediation server. In the present modification, the scanner and the scan engine are an example of "image forming device" and the "image forming engine", respectively.

(Modification 3) The printer 10 may not execute S94 of FIG. 5. For example, when the printing is completed in T160 of FIG. 6, the printer 10 may not disconnect the connection with the server 100 in T170. Further, for example, when the printer 10 receives the GN(EWM)Res including the canceling information from the server 100 in T264 of FIG. 7, the printer 10 may not disconnect the connection with the server 100 in T270. Further, for example, when the printer 10 accepts the canceling operation from the user in T360 of FIG. 8, the printer 10 may not disconnect the connection with the server 100 in T370. In the present modification, "disconnect the connection in a case where the image formation is completed", "disconnect the connection in the case where the image formation stop command is received" and "disconnect the connection in a case where a stop operation for stopping the image formation is performed" may be omitted.

(Modification 4) The printer 10 may not execute S100 of FIG. 5. That is, when the print error occurs in T460 of FIG. 9, the printer 10 may not disconnect the connection with the server 100 in T470. In the present modification, "disconnect the connection in a case where an error occurs at the image forming engine" can be omitted.

(Modification 5) The printer 10 may not reestablish the connection in S72 when YES is determined in S104 of FIG. 5. In the present modification, "reestablish the connection" can be omitted.

(Modification 6) The printer 10 may be configured to always proceed to S30 after S10 without executing S12 or S20 of FIG. 3. In other words, the printer 10 may establish the connection with the server 100 regardless of whether the printer 10 is in the proxy environment or in the non-proxy environment. In the present modification, "determine whether the image forming device is in a proxy environment or a non-proxy environment" can be omitted.

(Modification 7) The printer 10 may not execute S102 of FIG. 5. Generally speaking, when the connection is disconnected, the repetitive sending of the inquiry request to the server may not be resumed.

(Modification 8) In the above embodiments, the processes of FIGS. 2 to 11 are implemented by the CPU 32 of the printer 10 executing the program 36, however, at least one of these processes may be implemented by hardware such as a logic circuit.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

What is claimed is:
1. An image forming device comprising:
a print engine; and
a controller configured to:
repeatedly send using a first transmission mode an inquiry request to a server without user intervention, the first transmission mode being a mode without using a connection of server-push type with the server, wherein the connection of the server-push type enables sending of a signal from the server to the image forming device without the server receiving a signal from the image forming device;
receive a response signal including job identification information for identifying a job to be executed from the server in response to the inquiry request in a case where a job execution instruction is received from a terminal device by the server;
receive a response signal not including any job identification information from the server in response to the inquiry request in a case where the job execution instruction is not received from a terminal device by the server;
receive print data from the server in a case where the response signal includes the job identification information, wherein the print data is not received from the server in a case where the response signal does not include the job identification information;
control the print engine to start printing of an image on a print medium using the print data in a case where the print data received from the server;
in response to receiving the print data from the server, the print engine starting the printing and a particular network environment being satisfied, stop using the first transmission mode and establish a connection with the server using a second transmission mode, the second transmission mode being a mode that the connection of server-push type is used;
receive a printing stop command from the server after the connection of server-push type is established in a case where the server receives a job stop instruction from the terminal device, without receiving the inquiry request from the image forming device receiving the print data from the server; and
stop the printing of the image in a case where the printing stop command is received from the server.

2. The image forming device as in claim 1, wherein
the controller is further configured to disconnect the connection of server-push type in a case where the printing of the image is completed.

3. The image forming device as in claim 1, wherein
the controller is further configured to disconnect the connection of server-push type in the case where the printing stop command is received.

4. The image forming device as in claim 1, further comprising:
an operation unit configured to be operated by a user,
wherein the controller is further configured to disconnect the connection of server-push type in a case where a stop operation for stopping the printing of the image is performed on the operation unit, and
in a case where the stop operation is performed on the operation unit, the printing of the image is stopped without the printing stop command being received from the server.

5. The image forming device as in claim 1, wherein
the controller is further configured to disconnect the connection of server-push type in a case where an error occurs at the print engine after the printing of the image has been started.

6. The image forming device as in claim 5, wherein
the controller is further configured to reestablish the connection of server-push type in a case where the error is resolved after the error has occurred at the print engine.

7. The image forming device as in claim 1, wherein
the controller is further configured to determine whether the image forming device is in a proxy environment or a non-proxy environment in response to the print data being received from the server, wherein the proxy environment is an environment for executing communication with the server by using a proxy server, and the non-proxy environment is an environment for executing communication with the server without using the proxy server,
in a case where it is determined that the image forming device is in the proxy environment the particular network environment is not satisfied, and the connection of server-push type is not established, and
in a case where it is determined that the image forming device is in the non-proxy environment the particular network environment is satisfied, and the controller is configured to establish the connection of server-push type.

8. The image forming device as in claim 1, wherein
the controller is further configured to restart to repeatedly send the inquiry request to the server in a case where the connection of server-push type is disconnected.

9. The image forming device as in claim 1, wherein
the controller is further configured to continue to repeatedly send the inquiry request to the server in the case where the response signal received from the server includes the job identification information.

10. The image forming device as in claim 1, wherein
the job stop instruction is an instruction for canceling the job, and
the printing stop command is a command for canceling the printing of the image.

11. A non-transitory computer-readable recording medium storing computer-readable instructions for an image forming device:
the computer-readable instructions, when executed by a processor of the image forming device, cause the image forming device to:
repeatedly send, using a first transmission mode an inquiry request to a server without user intervention, the first transmission mode being a mode without using a connection of server-push type with the server, wherein the connection of the server-push type enables sending of a signal from the server to the image forming device without the server receiving a signal from the image forming device;
receive a response signal including job identification information for identifying a job to be executed from the server in response to the inquiry request in a case where a job execution instruction is received from a terminal device by the server;
receive a response signal not including any job identification information from the server in response to the inquiry request in a case where the job execution instruction is not received from a terminal device by the server;
receive print data from the server in a case where the response signal includes the job identification information, wherein the print data is not received from the server in a case where the response signal does not include the job identification information;
control a print engine to start printing of an image on a print medium using the received print data in a case where the print data received from the server;
in response to receiving the print data from the server, the print engine starting the printing and a particular network environment being satisfied, stop using the first transmission mode and establish a connection with the server using a second transmission mode, the second transmission mode being a mode that the connection of server-push type is used;
receive a printing stop command from the server after the connection of server-push type is established in a case where the server receives a job stop instruction from the terminal device without receiving the inquiry request from the image forming device receiving the print data from the server; and
stop the printing of the image in a case where the printing stop command is received.

* * * * *